United States Patent
Gilmore et al.

(10) Patent No.: US 10,444,105 B2
(45) Date of Patent: Oct. 15, 2019

(54) SHAFT BALANCED VIA MAGNETICALLY DISTRIBUTED WEIGHTED PARTICLES AND RELATED MACHINE AND METHOD

(71) Applicant: American Axle & Manufacturing, Inc., Detroit, MI (US)

(72) Inventors: Curt D. Gilmore, Fenton, MI (US); Holly A. Giangrande, Troy, MI (US)

(73) Assignee: AMERICAN AXLE & MANUFACTURING, INC., Detroit, MI (US)

( * ) Notice: Subject to any disclaimer, the term of this patent is extended or adjusted under 35 U.S.C. 154(b) by 227 days.

(21) Appl. No.: 15/228,269

(22) Filed: Aug. 4, 2016

(65) Prior Publication Data

US 2018/0038762 A1    Feb. 8, 2018

(51) Int. Cl.
    *G01M 1/32*      (2006.01)

(52) U.S. Cl.
    CPC ..................... *G01M 1/32* (2013.01)

(58) Field of Classification Search
    CPC ............... G01M 1/323; G01M 1/365
    See application file for complete search history.

(56) References Cited

U.S. PATENT DOCUMENTS

| | | | |
|---|---|---|---|
| 4,895,551 A | | 1/1990 | Fritz |
| 4,998,448 A | | 3/1991 | Ellis, Jr. |
| 5,141,768 A | * | 8/1992 | Ibe ..................... G01M 1/323 118/669 |
| 6,826,817 B1 | * | 12/2004 | Rapp ................... F16F 15/322 29/428 |
| 8,042,659 B1 | * | 10/2011 | Welsh .................. F16F 15/366 188/267.2 |
| 2001/0035068 A1 | * | 11/2001 | Case ..................... F16F 15/36 74/573.1 |
| 2004/0180726 A1 | | 9/2004 | Freeman et al. |
| 2007/0041488 A1 | * | 2/2007 | Hoheisel ............... A61B 6/035 378/4 |
| 2013/0070903 A1 | * | 3/2013 | Behling ............... G01M 1/365 378/135 |

OTHER PUBLICATIONS

Ismail, Izwan, et al. "Fluid—particle separation of magnetorheological fluid in squeeze mode." Japanese Journal of Applied Physics 51.6R (2012): 067301.*

Tao, R. "Super-strong magnetorheological fluids." Journal of Physics: Condensed Matter 13.50 (2001): R979.*

\* cited by examiner

*Primary Examiner* — Peter J Macchiarolo
*Assistant Examiner* — Alexander A Mercado
(74) *Attorney, Agent, or Firm* — Harness, Dickey & Pierce, P.L.C.

(57) ABSTRACT

The present teachings provide for a method of balancing a shaft. The method can include depositing a mixture of a liquid and ferromagnetic particles on a first surface of a shaft. The first surface can be disposed about a longitudinal axis of the shaft. The method can include rotating the shaft about the longitudinal axis at a first angular velocity. The method can include applying a first magnetic field distribution to the rotating shaft to move the ferromagnetic particles into a desired weight distribution about the first surface. The method can include solidifying the liquid to fix the ferromagnetic particles to the first surface in the desired weight distribution.

17 Claims, 5 Drawing Sheets

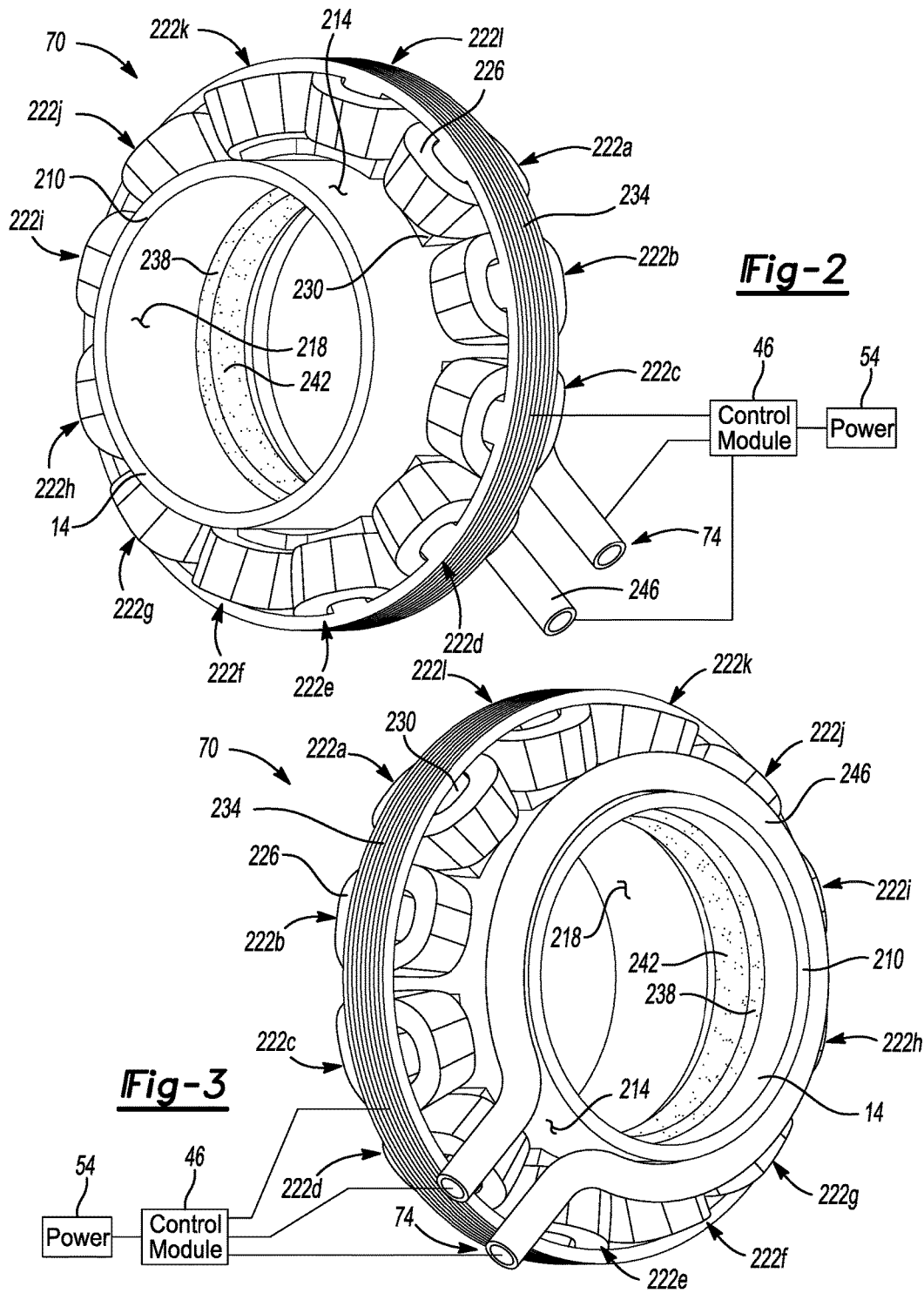

SHAFT BALANCED VIA MAGNETICALLY DISTRIBUTED WEIGHTED PARTICLES AND RELATED MACHINE AND METHOD

FIELD

The present disclosure relates to a shaft balanced via magnetically distributed weighted particles and a related machine and method for balancing a hollow shaft with magnetically distributed weighted particles.

BACKGROUND

This section provides background information related to the present disclosure which is not necessarily prior art.

In the manufacture of modern vehicle propeller shaft assemblies, it is common practice to include a balancing process to identify and counteract an unbalanced condition of a propeller shaft assembly, which typically includes a shaft, such as a hollow shaft capped on both ends, such as with cardan joints for example. A typical balancing process that utilizes a balancing machine is often included as one of the final operations in the overall manufacturing process of the propeller shaft assembly. The balancing machine will typically rotate the propeller shaft assembly at a predetermined speed and sense vibrations that can be caused by an unbalanced propeller shaft structure. The balancing machine then identifies where one or more balancing weights, typically solid masses, may need to be positioned on the propeller shaft assembly to counteract the vibrations caused by the unbalanced structure. Once the desired weight positions are identified, the typical balancing machine must stop rotation of the propeller shaft so that these weights can be affixed to discrete locations on an exterior surface of the propeller shaft, such as by adhesives or welding.

In some instances, the propeller shaft can become damaged during the process of physically affixing the solid weights to the exterior surface (e.g., due to high weld temperatures) and the propeller shaft assembly then has to be re-worked or scrapped. In other instances, the weights can be incorrectly positioned or affixed, causing the propeller shaft assembly to also be re-worked or scrapped. Furthermore, in some applications it is desirable that the exterior surface of the propeller shaft be coated or painted. In such applications, the typical balancing process requires that the weights be attached to the propeller shaft before such a coating or paint is applied in order to ensure proper attachment to the propeller shaft. However, imperfections in the application of the coating or paint can subsequently cause imbalances in the propeller shaft assembly, which can require the propeller shaft assembly to be re-worked or scrapped. Furthermore, since the hollow shaft is typically capped on both ends during the balancing process, the weights typically cannot be positioned and affixed to the interior of the hollow shaft.

SUMMARY

This section provides a general summary of the disclosure, and is not a comprehensive disclosure of its full scope or all of its features.

The present teachings provide for a method of balancing a shaft. The method can include depositing a mixture of a liquid and ferromagnetic particles on a first surface of a shaft. The first surface can be disposed about a longitudinal axis of the shaft. The method can include rotating the shaft about the longitudinal axis at a first angular velocity. The method can include applying a first magnetic field distribution to the rotating shaft to move the ferromagnetic particles into a desired weight distribution about the first surface. The method can include solidifying the liquid to fix the ferromagnetic particles to the first surface in the desired weight distribution.

The present teachings also provide for a method of balancing a shaft. The method can include suspending ferromagnetic particles in a liquid to form a mixture. The method can include depositing the mixture on an interior surface of a hollow shaft. The interior surface can be disposed about a longitudinal axis of the hollow shaft. The method can include rotating the hollow shaft about the longitudinal axis at a first angular velocity. The method can include detecting imbalances in the hollow shaft. The method can include activating an electromagnet disposed about an exterior of the hollow shaft to apply a first magnetic field distribution to the hollow shaft to attract the ferromagnetic particles to at least one desired location about the interior surface. The method can include rotating the first magnetic field distribution about the rotational axis at the first angular velocity while the hollow shaft rotates at the first angular velocity. The method can include solidifying the liquid to fix the ferromagnetic particles to the interior surface in the desired locations.

The present teachings also provide for a shaft balancing device for balancing a shaft. The shaft balancing device can include a first end unit, a second end unit, a motor, an electromagnet and a control module. The first end unit can include a first support rotatable about an axis and adapted to be releasably attached to one end of a shaft. The second end unit can include a second support rotatable about the axis and adapted to be releasably attached to an opposite end of the shaft. The motor can be drivingly coupled to the first support to rotate the first support about the axis. The electromagnet can be disposed about the axis and axially between the first and second end units. The electromagnet can be configured to produce a magnetic field. The control module can be in communication with the electromagnet and configured to rotate the magnetic field about the axis.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 2 is a perspective view of a portion of the machine and shaft of FIG. 1;

FIG. 3 is another perspective view of the portion of the machine and shaft of FIG. 2;

Corresponding reference numerals indicate corresponding parts throughout the several views of the drawings.

DETAILED DESCRIPTION

Example embodiments will now be described more fully with reference to the accompanying drawings.

Figure 1:
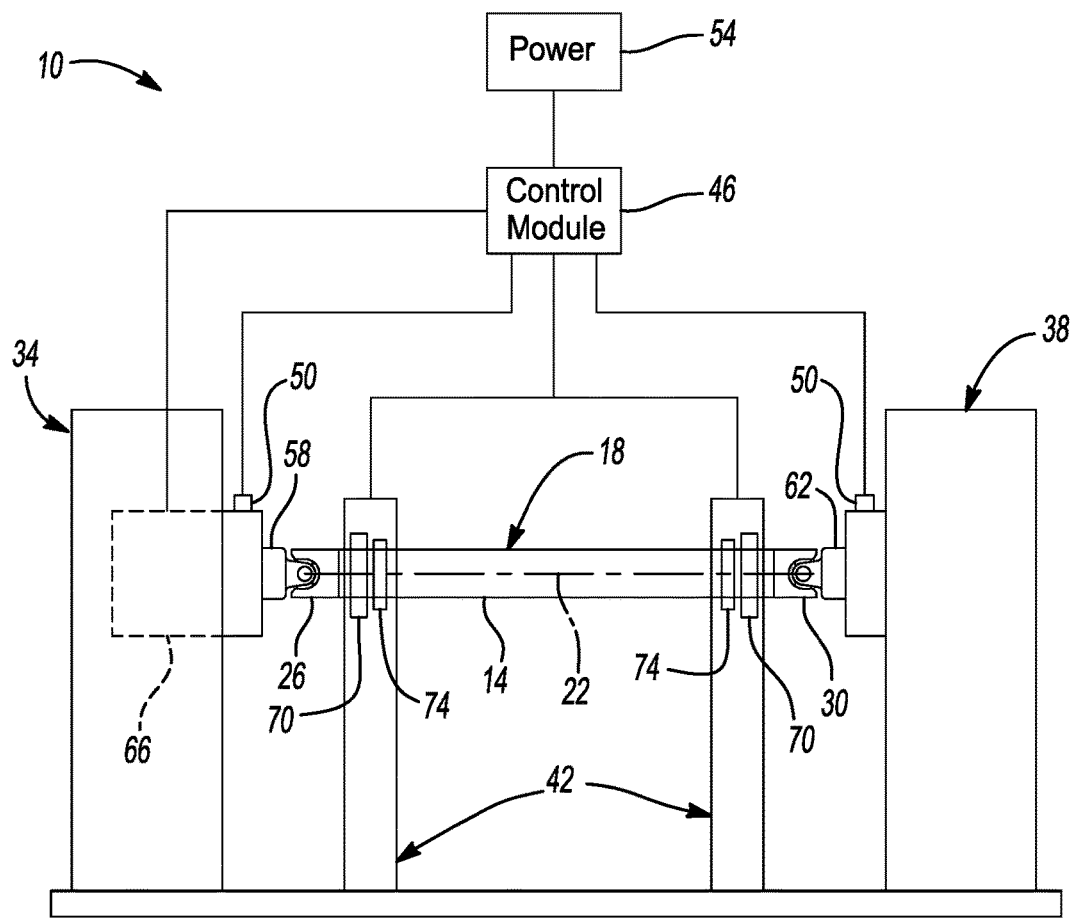
FIG. 1 is a schematic view of an example of a machine for balancing a shaft, constructed in accordance with the present teachings.
Figure 4:
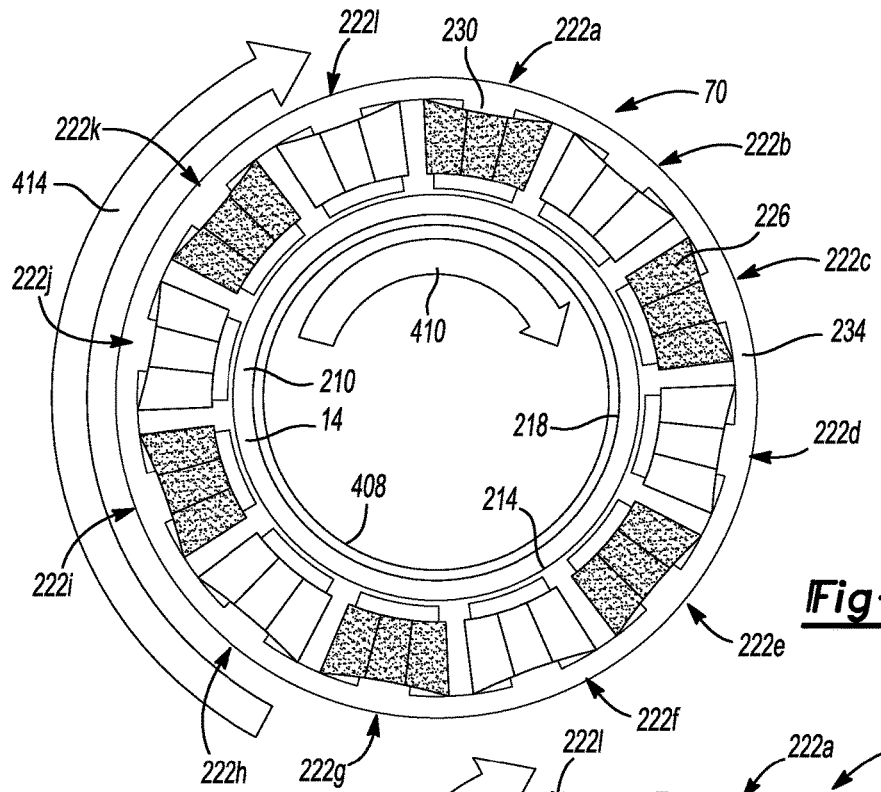
FIG. 4 is a schematic sectional view of the portion of the machine and shaft of FIG. 2, as viewed down a central axis of the shaft, illustrating the shaft and machine in a first operational state.

With reference to FIG. 1 of the drawings, an example of a shaft balancing machine 10 is illustrated supporting a shaft 14 for balancing. In the example provided, the shaft 14 is a hollow shaft and a component of a propshaft assembly 18, though other configurations can be used. The hollow shaft 14 can extend longitudinally along a central rotational axis 22 between opposite axial ends. In the example provided, the propshaft assembly 18 includes the hollow shaft 14, a first end bracket 26 at the first axial end, and a second end bracket 30 at the second axial end. The first end bracket 26 and second end bracket 30 can cap off the axial ends of the hollow shaft 14 and can seal the interior of the hollow shaft 14 to prevent liquid and/or particles from entering or exiting the hollow shaft 14. In the example provided, the hollow shaft 14, the first end bracket 26, and the second end bracket 30 are formed of aluminum and the first and second end brackets 26, 30 are welded to the axial ends of the hollow shaft 14, though other configurations or materials can be used.

The shaft balancing machine 10 can include a first end unit 34, a second end unit 38, at least one weight positioning unit 42, a control module 46, and at least one sensor 50. A power source 54 can provide electrical power to the shaft balancing machine 10. The first end unit 34 and second end unit 38 can be configured to support the opposite axial ends of the hollow shaft 14 for rotation about the axis 22. In the example provided, the first end unit 34 can include a first support 58 that can be releasably coupled to the first end bracket 26 for common rotation about the axis 22. In the example provided, the first end bracket 26 and first support 58 are mating parts of a universal joint, though other configurations can be used. In the example provided, the second end unit 38 can include a second support 62 that can be releasably coupled to the second end bracket 30 for common rotation about the axis 22. In the example provided, the second end bracket 30 and second support 62 are mating parts of a universal joint, though other configurations can be used.

In an alternative configuration, not specifically shown, one or both of the first support 58 or the second support 62 can be a chuck and the corresponding axial end of the hollow shaft 14 can include a member other than a universal joint that caps that axial end, or that axial end can remain uncapped (i.e., can remain open). In such a configuration, the chuck (not shown) can fixedly, but releasably, grip the respective axial end of the hollow shaft 14 for common rotation about the axis 22.

In the example provided, the first end unit 34 includes a motor 66 drivingly coupled to the first support 58 to rotate the first support 58 about the axis 22. In an alternative construction, not specifically shown, the second end unit 38 includes the motor 66. In another construction, not specifically shown, both the first end unit 34 and the second end unit 38 include motors similar to the motor 66 and are configured to rotate the first and second supports 58, 62 at the same rate.

The sensor 50 can be any suitable type of sensor configured to detect imbalances in a rotating shaft. In the example provided, the sensor 50 is an accelerometer, though other types of sensors can be used. In the example provided there are two sensors 50, with one of the sensors 50 being mounted to the first end unit 34 and the other one of the sensors 50 being mounted to the second end unit 38, though other configurations can be used. The sensors 50 can be of similar types, or of different types from one another.

The weight positioning unit 42 can be disposed axially between the first end unit 34 and the second end unit 38. The weight positioning unit 42 can include an electromagnet 70 and a curing device 74 that can both be disposed about the axis 22. The hollow shaft 14 can extend through the weight positioning unit 42 and through the electromagnet 70 and the curing device 74 such that the electromagnet 70 and the curing device 74 can be disposed about the hollow shaft 14. In the example provided, there are two weight positioning units 42, with one of the weight positioning units 42 located axially proximate to the first end unit 34, and the other one of the weight positioning units 42 located axially proximate to the second end unit 38, though other configurations can be used. The two weight balancing units 42 can be similar, while being independently controlled by the control module 46. Thus, in the example provided, the balancing machine 10 can be configured for two-axis balancing, to balance each end of the hollow shaft 14 independently of each other, though other configurations can be used. The two weight balancing units 42 may also be operated simultaneously such that both ends of the hollow shaft 14 may be balanced simultaneously, though other configurations can be used. The electromagnet 70 and the curing device 74 of one of the weight positioning units 42 are described in greater detail below. The electromagnet 70 and the curing device 74 of the other one of the weight positioning units can be constructed and operated similarly.

With additional reference to FIGS. 2 and 3, a portion 210 of the hollow shaft 14 that is disposed within the weight positioning unit 42 (FIG. 1) is illustrated with an example electromagnet 70 and curing device 74. The hollow shaft 14 can have a cylindrical exterior surface 214 and a cylindrical interior surface 218 that can be coaxially disposed about the axis 22 and can extend axially between the axial ends of the hollow shaft 14. The interior surface 218 can be radially inward of the exterior surface 214. In the example provided, the hollow shaft 14 can have a generally constant thickness (i.e., distance between the exterior and interior surfaces 214, 218) along the length of the portion 210, though other configurations can be used.

The electromagnet 70 can include a plurality of coil units 222 disposed circumferentially about the axis 22. In the example provided, the coil units 222 are equally spaced about the axis 22 and disposed radially outward of the exterior surface 214 of the hollow shaft 14. In the example provided, the electromagnet 70 includes twelve coil units 222 (indicated as 222a-l), though greater or fewer coil units 222 can be used. Each coil unit 222 can have a plurality of coils 226 formed of conductive wire that can be coiled about a respective spool 230. Each spool 230 can be fixedly supported about the hollow shaft 14 by an annular support ring 234 disposed about the axis 22. The spools 230 can hold the coils 226 radially outward of the exterior surface 214 of the hollow shaft 14. The coils 226 can be arranged on their respective spools 230 such that when the coil unit 222 is activated and electrical current flows through the respective coils 226, a magnetic field (not shown) is generated. The electromagnet 70 can be spaced apart from the hollow shaft 14 and the magnetic field (not shown) can be a strength such that the magnetic field can penetrate through the hollow shaft 14 to reach the interior surface 218. The hollow shaft 14 can rotate about the axis 22 relative to the electromagnet 70.

The coil units 222 can be in electrical communication with the control module 46. The control module 46 can be in electric communication with the power source 54. The control module 46 can be located within the weight positioning unit 42, or can be located external to the weight positioning unit 42. The power source 54 can be any suitable source of electrical power, such as an electrical storage medium (e.g., battery), or an external electrical supply (e.g., AC or DC power lines). The control module 46 can be configured to control the supply of electrical power to the electromagnet 70. The control module 46 can also be in electrical communication with the motor 66 (FIG. 1) to supply power to the motor 66 (FIG. 1) to control operation of the motor 66 (FIG. 1). The control module 46 can also be in electrical communication with the sensor 50 (FIG. 1) to receive input from the sensor 50 (FIG. 1) indicative of a magnitude and location of imbalances within the hollow shaft 14 as the hollow shaft 14 rotates about the axis 22, as described below.

The control module 46 can be configured to control power to individual ones of the coil units 222 separately from other ones of the coil units 222. Thus, the control module 46 can control the locations and/or strengths of the magnetic fields generated about the hollow shaft 14 and can selectively change the locations and/or strengths of the magnetic fields.

The curing device 74 can be configured to cure (i.e., solidify) a liquid material 238 that can be located within the interior of the hollow shaft 14 axially aligned with the electromagnet 70. A plurality of ferromagnetic particles 242 can be suspended in the liquid material 238. The liquid material 238 may be a viscous liquid. In the example provided, the liquid material 238 is a heat-curable resin and the curing device 74 includes an inductive heating coil 246, though other configurations can be used. For example, the curing device 74 can be a resistance heating element and the control module 46 can selectively provide electrical current to the curing device 74 to heat the resistance heating element to heat the hollow shaft 14. In the example provided, the ferromagnetic particles 242 are iron granules, though other configurations can be used. The liquid material 238 and ferromagnetic particles 242 are described in greater detail below.

The inductive heating coil 246 can circumscribe a portion 210 of the hollow shaft 14 adjacent to the electromagnet 70, such that the inductive heating coil 246 can heat the portion 210 of the hollow shaft 14 at least in an axial location where the liquid material 238 is present. The control module 46 can be in electrical communication with the curing device 74 to operate the inductive heating coil 246. In the example provided, the control module 46 selectively provides high frequency AC electrical current to the inductive heating coil 246 to produce a rapidly alternating magnetic field that can heat the portion 210 of the hollow shaft 14. The strength, frequency, and location of the magnetic field produced by the inductive heating coil 246 can be configured so as to not interfere with the operation of the electromagnet 70 and the interactions between the magnetic fields of the electromagnet 70 and the ferromagnetic particles 242, described below.

Figure 6:
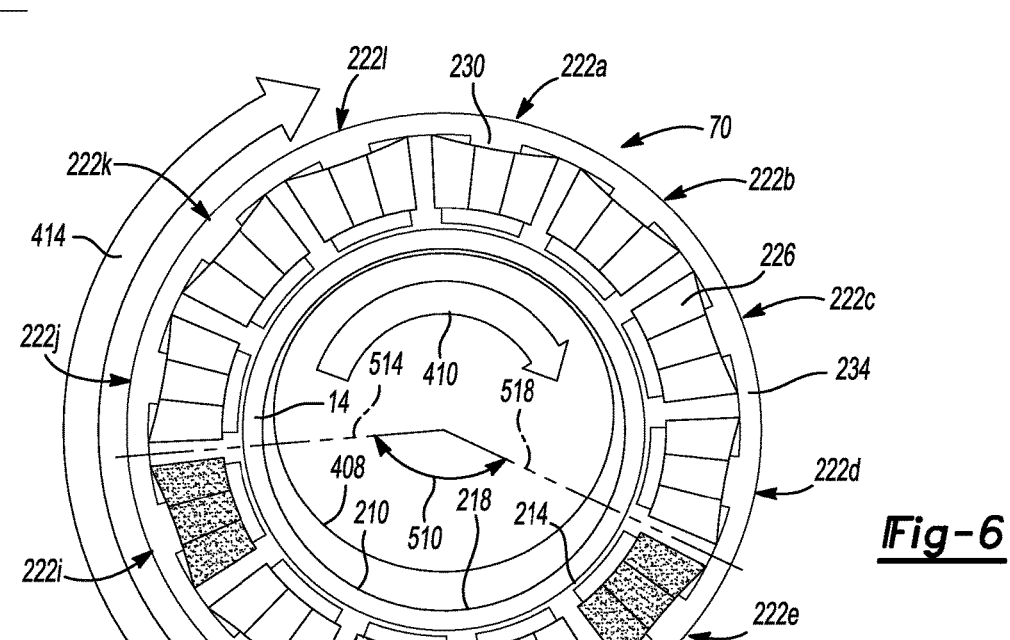
FIG. 6 is a schematic sectional view similar to FIG. 4, illustrating the shaft and machine in a third operational state.
Figure 7:
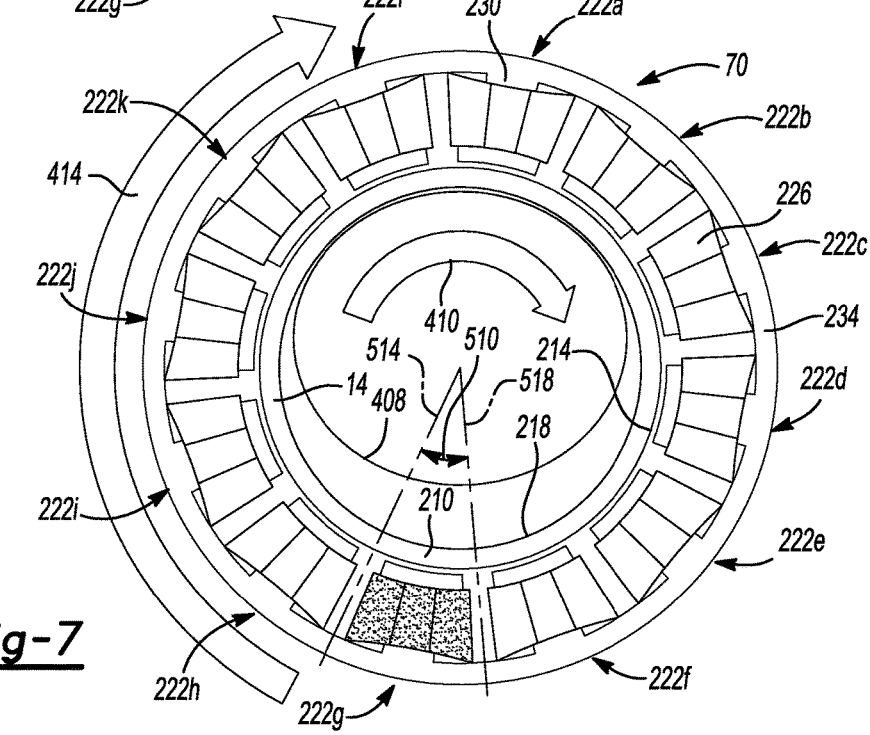
FIG. 7 is a schematic sectional view similar to FIG. 4, illustrating the shaft and machine in a fourth operational state.
Figure 8:
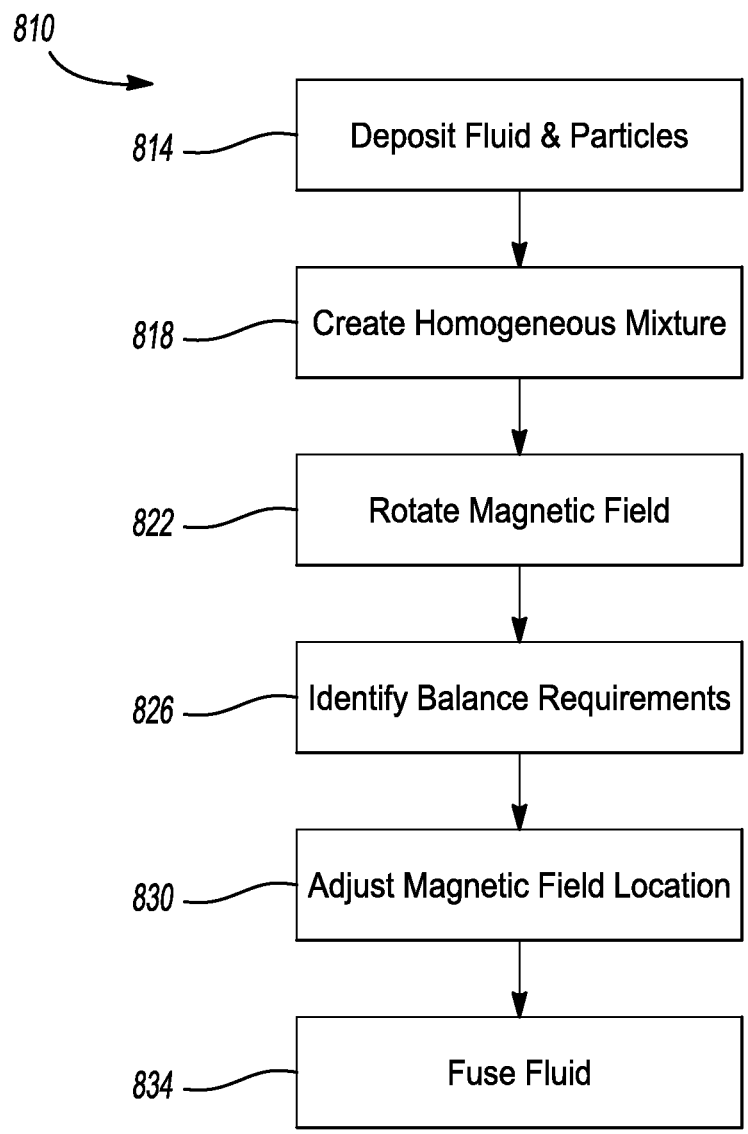
FIG. 8 is a flow chart of a method of balancing a shaft in accordance with the present teachings.

With continued reference to FIGS. 1-3 and additional reference to FIGS. 4-8, operation of the shaft balancing machine 10 is described. FIG. 8 illustrates a method 810 of operating the shaft balancing machine 10 in flow-chart format. FIGS. 4-7 schematically illustrate operation of the electromagnet 70 and rotation of the hollow shaft 14 during the operation of the shaft balancing machine 10. The distribution of the ferromagnetic particles 242 in the liquid material 238 is schematically illustrated in FIGS. 4-7 by layer 408. The radial thicknesses of the layer 408, which includes the liquid material 238 and the ferromagnetic particles 242, is schematically exaggerated in FIGS. 4-7 to better illustrate the operation of the shaft balancing machine 10.

At step 814, the liquid material 238 can be mixed with the ferromagnetic particles 242 and the mixture can be deposited along the interior surface 218 of the hollow shaft 14. The hollow shaft 14 can be mounted to the first and second end units 34, 38 either before or after the mixture is deposited within the hollow shaft 14. In the example provided, the end brackets 26, 30 can be affixed to the hollow shaft 14 after the mixture is deposited, such that the mixture can be sealed within the propshaft assembly 18, and the propshaft assembly 18 can then be mounted to the first and second end units 34, 38.

After the mixture is within the hollow shaft 14 and the hollow shaft 14 is mounted to the shaft balancing machine 10, the method 810 can proceed to step 818. At step 818, a homogeneous suspension of the ferromagnetic particles 242 within the liquid material 238 can be created. To create the homogeneous suspension, the motor 66 can be operated to rotate the hollow shaft 14 about the axis 22. At step 818, the electromagnet 70 can be activated to produce a magnetic field (not shown) of a first field distribution. The first field distribution can be uniform around the circumference of the hollow shaft 14 and stationary relative to the axis 22. For example, the control module 46 can activate all of the coil units 222, or every other one of the coil units 222, or another distribution of the coil units 222 that produces an overall magnetic field that is evenly distributed circumferentially about the hollow shaft 14. In the example illustrated in FIG. 4, the activated coil units 222 are illustrated with shading to schematically indicate their activated state. In the example provided, every other coil unit 222 is activated to produce a circumferentially uniform magnetic field.

The control module 46 can keep the magnetic field stationary relative to the axis 22 while the hollow shaft 14 rotates about the axis 22. In the example illustrated in FIG. 4, the rotation of the hollow shaft 14 is schematically indicated by arrow 410 and has an angular velocity of $\omega 1>0$, while the rotation of the magnetic field is indicated by arrow 414 and has an angular velocity of $\omega 2=0$. In the example provided, $\omega 1$ is 600 revolutions per minute, though other speeds can be used. This rotation of the hollow shaft 14 through the stationary magnetic field can stir the ferromagnetic particles 242 in the liquid material 238 to create a homogeneous suspension of the ferromagnetic particles 242. Thus, the layer 408 is schematically illustrated as having a uniform thickness about the interior surface 218. The rotation of the hollow shaft 14 can also distribute the liquid material 238 within the hollow shaft 14, such that the liquid material 238 has a uniform radial thickness about the inner circumference of the hollow shaft 14. Once the homogeneous suspension is created, the method 810 can proceed to step 822 without interruption of the rotation of the hollow shaft 14.

At step 822, the hollow shaft 14 can continue to rotate at an angular velocity ω1>0 and the control module 46 can change the magnetic field to a second field distribution. The second field distribution can be such that the magnetic field can be rotated at an angular velocity equal to that of the hollow shaft 14 (e.g., ω2=ω1>0). In other words, the magnetic field can be rotated about the axis 22 at the same angular velocity as the hollow shaft 14. In the example provided, ω1 and ω2 are 600 RPM, though other rotational speeds can be used.

In the example provided, the magnetic field is rotated by altering which ones of the coil units 222 are activated. In the example provided, coil units 222a, 222c, 222e, 222g, 222i, and 222k are initially activated, with the others deactivated, then coil units 222b, 222d, 222f, 222h, 222j, and 222l are activated, with the others deactivated, and the sequence repeats to rotate the magnetic field. While every other coil unit 222 is shown activated, other distributions and sequences of activated coil units 222 can be used to rotate the magnetic field, such as coil units 222a, 222d, 222g, and 222j, then 222b, 222e, 222h, 222k, then 222c, 222f, 222i, 222l, for example.

In an alternative configuration, the particular coil units 222 that are activated can remain constant, while the coil units 222 physically rotate about the axis 22 in order to cause the magnetic field to rotate about the axis 22. In such an alternative construction, the annular support ring 234 can rotate about the axis 22 to rotate the coil units 222. In this alternative construction, the control module 46 can still control or change the activation of specific coil units 222 to control or change the circumferential distribution of the magnetic fields (e.g., an arc length of the hollow shaft 14 through which the magnetic fields are strongest).

Once the magnetic field is rotating at the same angular velocity as the hollow shaft 14, the method 810 can proceed to step 826. At step 826, while the magnetic field and the hollow shaft 14 rotate at the same angular velocity (e.g., ω2=ω1=600 RPM), the control module 46 can receive and interpret signals received from the sensor 50 to identify a weight distribution profile. The weight distribution profile can indicate circumferential locations where additional weight is needed to balance the hollow shaft 14, and how much weight is needed in those locations to achieve a desired level of balance. Once the weight distribution profile is determined, the method 810 can proceed to step 830.

At step 830, the angular velocity of the hollow shaft 14 can remain equal to the angular velocity of the magnetic field (e.g., ω2=ω1=600 RPM). The control module 46 can adjust the circumferential distribution of the activated coil units 222 based on the weight distribution profile to produce a third field distribution. In other words, the control module 46 can adjust the strength and/or location of the activated coil units 222 to concentrate the magnetic field in areas where additional weight is needed to balance the rotating hollow shaft 14.

Figure 5:
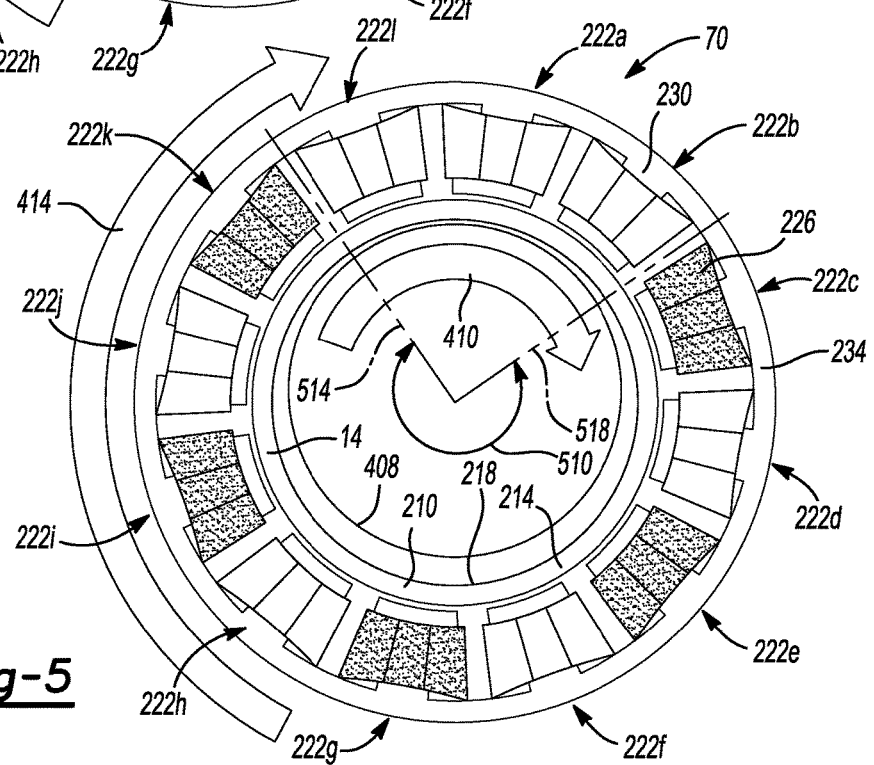
FIG. 5 is a schematic sectional view similar to FIG. 4, illustrating the shaft and machine in a second operational state.

In the example provided, FIGS. 5-7 illustrate the control module 46 incrementally changing the circumferential locations of the activated coil units 222. For example, FIG. 5 illustrates coil units 222c, 222e, 222g, 222i, and 222k activated such that a region of activated coil units 222 is provided throughout the arc length 510 between dashed lines 514, 518. The activated region of the arc length 510 rotates such that the magnetic field continues to rotate at an angular velocity equal to the angular velocity of the hollow shaft 14 (e.g., ω2=ω1=600 RPM). Thus, the suspended ferromagnetic particles 242 can be magnetically attracted to the region of the arc length 510 to provide additional weight within the arc length 510. This concentration of the ferromagnetic particles 242 is illustrated in FIGS. 5-7 by the schematic thickening of the layer 408, though it is appreciated that the actual thickness of the liquid material 238 can remain uniform while the ferromagnetic particles 242 can become more concentrated in the areas of the layer 408 that are schematically illustrated as thicker.

The control module 46 can continue to receive and analyze input from the sensor 50 (FIG. 1) to update the weight distribution profile and modify the arc length 510 until the desired balance is achieved. In the example provided, FIGS. 6 and 7 illustrate sequential arc lengths 510' and 510" of coil unit 222 activation to achieve a final weight distribution profile schematically shown in FIG. 6. The control module 46 can rotate the hollow shaft 14 and the arc length 510 for a predetermined amount of time at each arc length 510, 510', 510", or until a desired balance is detected, then proceed to the next arc length 510, 510', 510".

While a single arc length 510,510',510" is illustrated, the control module 46 can activate and rotate activation of the coil units 222 to produce additional activated arc lengths (not shown) that can be circumferentially spaced apart from the arc length 510, 510', or 510" if multiple, circumferentially separated locations need additional weight to achieve the desired balance.

After the desired weight distribution is achieved to balance the hollow shaft 14, the method can proceed to step 834. At step 834, the hollow shaft 14 and magnetic field can continue to rotate at equal velocities (e.g., ω2=ω1=600 RPM), while the curing device 74 can cure the liquid material 238 to fix the distribution of the ferromagnetic particles 242 relative to the hollow shaft 14.

In one alternative construction of the curing device 74, not specifically shown, the curing device 74 can be similar to that illustrated in FIGS. 2-7, except one axial end of the hollow shaft 14 can be open and the curing device 74 can be received therein to be disposed radially inward of the interior surface 218 of the hollow shaft 14. The curing device 74 can be an induction heating coil similar to the curing device 74 described above with reference to FIGS. 2-7, to heat the hollow shaft 14 from the inside, though other configurations can be used. For example, the liquid material 238 can be configured to be cured by introduction of a curing chemical substance (not shown) and the curing device 74 can be configured to distribute that curing chemical substance within the hollow shaft 14. In another example, the liquid material 238 can be configured to cure in reaction to exposure to light of a predetermined wavelength (e.g., UV light) and the curing device 74 can be configured to emit light of the predetermined wavelength to cure the liquid material 238.

In another alternative construction, the weight positioning unit 42 does not include the curing device 74. In this alternative construction, the liquid material 238 can be configured to cure after a predetermined amount of time. In operation at step 834, the control module 46 can be configured to rotate the hollow shaft 14 and the magnetic field in the final weight distribution until that predetermined amount of time passes and the liquid material 238 cures within the hollow shaft 14.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments

What is claimed is:

1. A method of balancing a shaft, the method comprising:
   depositing a mixture of a liquid and ferromagnetic particles on a first surface of a shaft, the first surface being deposited about a longitudinal axis of the shaft;
   rotating the shaft about the longitudinal axis at a first angular velocity;
   applying a first magnetic field distribution to the rotating shaft to move the ferromagnetic particles into a desired weight distribution about the first surface; and
   solidifying the liquid to permanently fix the ferromagnetic particles to the first surface in the desired weight distribution.

2. The method of claim 1, further comprising:
   before applying the first magnetic field distribution, creating a homogeneous suspension of the ferromagnetic particles in the liquid about the first surface.

3. The method of claim 2, wherein creating the homogeneous suspension of the ferromagnetic particles in the liquid about the first surface includes applying a second magnetic field distribution while rotating the shaft at a second angular velocity.

4. The method of claim 3, wherein the second magnetic field distribution is a non-rotating magnetic field distribution evenly about the longitudinal axis.

5. The method of claim 1, wherein the first magnetic field distribution is a rotating magnetic field that rotates about the longitudinal axis at the first angular velocity while the shaft rotates about the longitudinal axis at the first angular velocity.

6. The method of claim 1, further comprising:
   before applying the first magnetic field distribution:
      applying a second magnetic field distribution while the shaft rotates at the first angular velocity, wherein the second magnetic field distribution is a rotating magnetic field disposed evenly about the longitudinal axis and rotating about the longitudinal axis at the first angular velocity;
   while applying the second magnetic field distribution and rotating the shaft at the first angular velocity: detecting imbalances in the shaft; and
   determining a desired weight distribution to balance the shaft.

7. The method of claim 1, wherein solidifying the liquid includes heating a portion of the shaft to a predetermined temperature.

8. The method of claim 7, wherein heating the portion of the shaft includes activating an induction heating coil disposed about the shaft.

9. The method of claim 1, wherein solidifying the liquid includes rotating the shaft and the first magnetic field distribution at the first angular velocity for a predetermined amount of time.

10. The method of claim 1, wherein the shaft is a hollow shaft and the first surface is an interior surface of the hollow shaft.

11. The method of claim 10, further comprising:
    sealing the liquid within the hollow shaft before applying the first magnetic field distribution.

12. A method of balancing a shaft, the method comprising:
    suspending ferromagnetic particles in a liquid to form a mixture;
    depositing the mixture on an interior surface of a hollow shaft, the interior surface being disposed about a longitudinal axis of the hollow shaft;
    rotating the hollow shaft about the longitudinal axis at a first angular velocity;
    detecting imbalances in the hollow shaft;
    activating an electromagnet disposed about an exterior of the hollow shaft to apply a first magnetic field distribution to the hollow shaft to attract the ferromagnetic particles to at least one desired location about the interior surface;
    rotating the first magnetic field distribution about the rotational axis at the first angular velocity while the hollow shaft rotates at the first angular velocity; and
    solidifying the liquid to permanently fix the ferromagnetic particles to the interior surface in the desired locations.

13. The method of claim 12, further comprising:
    before detecting imbalances in the hollow shaft, activating the electromagnet to apply a second magnetic field distribution while rotating the shaft at a second angular velocity, wherein the second magnetic field distribution is a non-rotating magnetic field disposed evenly about the longitudinal axis.

14. The method of claim 12, further comprising:
before applying the first magnetic field distribution, applying a second magnetic field distribution while the shaft rotates at the first angular velocity, wherein the second magnetic field distribution is a rotating magnetic field disposed evenly about the longitudinal axis and rotating about the longitudinal axis at the first angular velocity;
while applying the second magnetic field distribution and rotating the hollow shaft at the first angular velocity, detecting imbalances in the hollow shaft; and
determining a desired weight distribution to balance the hollow shaft.

15. The method of claim 12, wherein solidifying the liquid includes heating a portion of the hollow shaft to a predetermined temperature.

16. The method of claim 12, wherein solidifying the liquid includes rotating the hollow shaft and the first magnetic field distribution at the first angular velocity for a predetermined amount of time.

17. The method of claim 12, further comprising: sealing the liquid within the hollow shaft before activating the electromagnet to apply the first magnetic field distribution.

* * * * *